Dec. 20, 1960 R. B. CAMPBELL 2,965,351
VALVE HAVING FLUID RETARDING MEANS
Original Filed Oct. 11, 1954
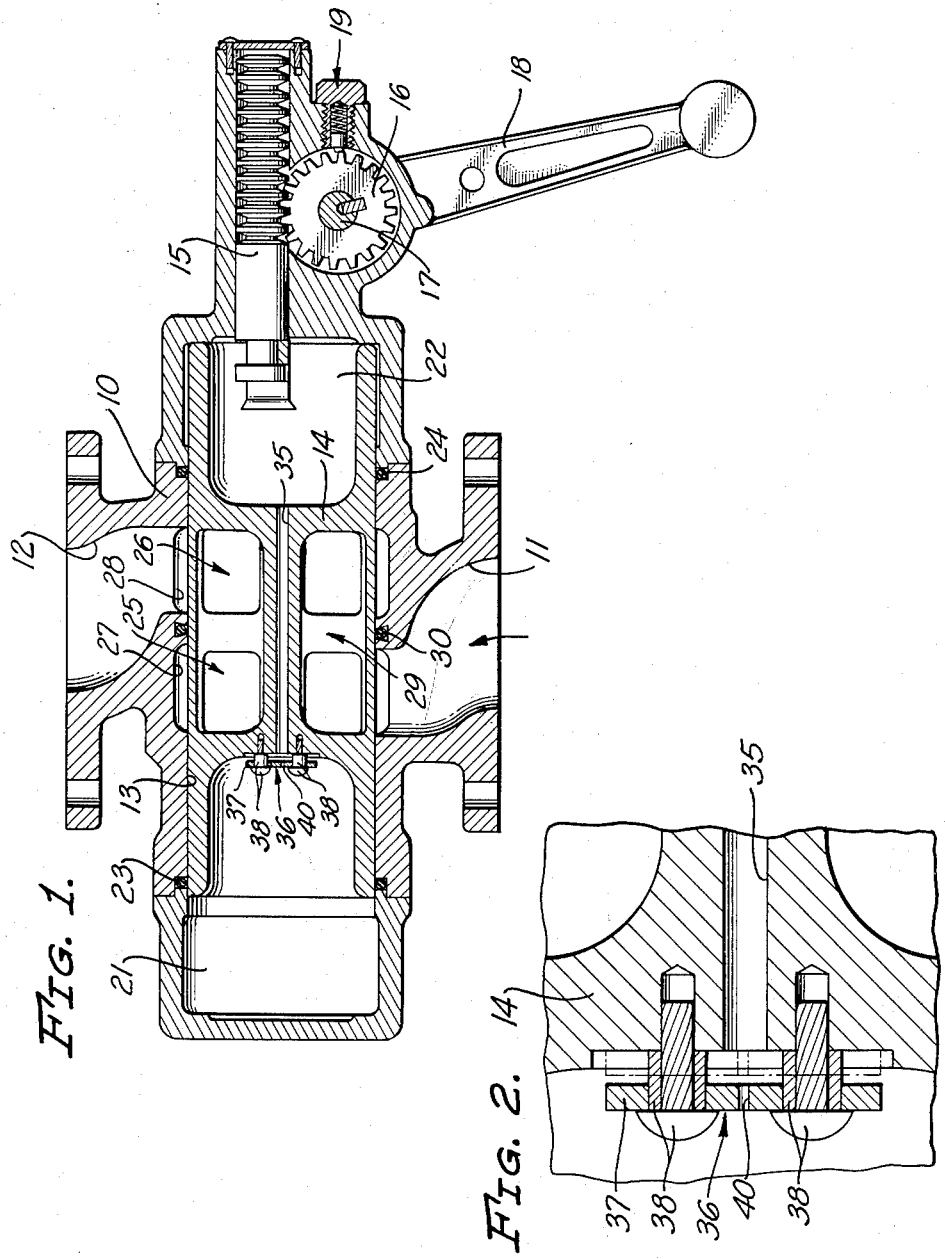
INVENTOR
RODNEY B. CAMPBELL
BY HIS ATTORNEYS
HARRIS, KIECH, RUSSELL & KERN

United States Patent Office 2,965,351
Patented Dec. 20, 1960

2,965,351

VALVE HAVING FLUID RETARDING MEANS

Rodney B. Campbell, 1633 Ridgeview Drive, Glendale 7, Calif., assignor to Malcolm R. Maben, Burbank, Calif., trustee Original application Oct. 11, 1954, Ser. No. 461,467, now Patent No. 2,931,615, dated Apr. 5, 1960. Divided and this application Apr. 13, 1959, Ser. No. 805,987

1 Claim. (Cl. 251—54)

The present application is a division of my copending application Serial No. 461,467, filed October 11, 1954, now Patent No. 2,931,615, granted April 5, 1960, and discloses and claims an invention which relates in general to valves and a primary object of which is to provide a valve having means for restricting the rate of movement of a valve element in at least one direction as such valve element is moved in opposite directions between open and closed positions, whereby to prevent pressure surges in a system in which the valve is installed.

More particularly, an important object of the invention is to provide a valve having at least a slow closing movement to prevent pressure surges in the system during closing movement of the valve element, another object being to provide a valve having a slow closing movement and a fast opening movement.

Still another object is to provide a valve having therein a valve element provided with chambers on opposite sides thereof, there being means of fluid communication between such chambers which regulates the rates of opening and closing movements of the valve element. A related object is to provide a valve wherein the chambers mentioned are separated from the flow passage through the valve so that the fluid in the chambers may differ from the fluid flowing through the valve.

A further object is to provide a valve wherein the valve element is a piston or piston valve and wherein the chambers mentioned are located at opposite ends of the piston valve, the chambers being interconnected by a passage which bypasses the piston valve, such interconnecting passage preferably being formed in the piston valve.

Yet another object of the invention is to provide a valve having means for providing free fluid communication between the chambers during opening movement of the piston valve, but providing restricted fluid communication therebetween during closing movement of the piston valve so as to limit the rate at which the piston valve may be moved to its closed position, thereby avoiding pressure surges in the system during such movement of the piston valve.

Still another object is to provide a valve wherein the passage interconnecting the two chambers has associated therewith valve means for providing free fluid interchange between the chambers during opening movement of the piston valve, such valve means providing restricted fluid communication between the chambers during closing movement of the piston valve.

Yet another object is to provide a valve wherein the passage interconnecting the chambers mentioned extends centrally through the piston valve from one end thereof to the other, the valve means for respectively providing free and restricted communication between the chambers during opening and closing movement of the piston valve being carried by the piston valve.

A still further object is to provide a valve wherein the valve means mentioned includes a valve element adapted to seat on one end of the piston valve and having therethrough a restricted orifice which provides the desired restricted fluid flow between the chambers during closing movement of the piston valve, this valve element unseating during opening movement of the piston valve to provide free fluid interchange between the two chambers.

Various other objects reside in the provision of certain structural features which are described in detail hereinafter and defined in the appended claim and illustrated in the accompanying drawing. Referring to the drawing:

Fig. 1 is a longitudinal sectional view through a valve which embodies the invention; and Fig. 2 is a fragmentary longitudinal sectional view duplicating a portion of Fig. 1 on an enlarged scale.

Referring to the drawing, the numeral 10 designates a valve body having an inlet port 11 and an outlet port 12 which communicate, at axially spaced points, with a bore 13 for a piston valve 14, the piston valve being movable between open and closed positions by a rack 15 which is connected to the piston valve and which is reciprocable in the valve body 10. Meshed with the rack 15 is a gear 16 on a shaft 17 to which a handle 18 is connected. As will be apparent, by swinging the handle 18 back and forth, the piston valve 14 may be reciprocated in the bore 13 between its open and closed positions. A detent means 19 engageable with the gear 16 maintains the piston valve 14 in whatever position it is placed by the handle 18.

The valve body 10 provides fluid chambers, e.g., air chambers, 21 and 22 at the ends of the piston valve 14, leakage from the ports 11 and 12 into the chambers 21 and 22 being prevented by O-rings 23 and 24 disposed in grooves in the valve body 10 and engaging the piston valve 14 for all positions of the latter.

The piston valve 14 is provided with axially spaced port means 25 and 26, each shown as providing a plurality of ports. The port means 25 and 26 respectively communicate with annular channels 27 and 28 when the piston valve 14 is in its open position, the channels 27 and 28, in turn, communicating with the inlet and outlet ports 11 and 12. The piston valve 14 is provided with passage means 29 therethrough interconnecting the port means 25 and 26 thereof so that, when the piston valve is in its open position, fluid from the inlet port 11 flows to the outlet port 12 by way of the annular channel 27, the port means 25, the passage means 29, the port means 26 and the annular channel 28. When the piston valve 14 is in its closed position, it is displaced leftwardly from the position shown in Fig. 1 of the drawing to a position such that the port means 26 is out of communication with the channel 28 leading to the outlet port 12. Disposed in a groove in the valve body 10 between the annular channels 27 and 28 is a sealing ring 30 which engages the periphery of the piston valve 14 in an area between the port means 25 and 26 and the right end of the piston valve when the piston valve is in its closed position, thereby preventing fluid leakage between the inlet port 11 and the outlet port 12 when the valve is closed.

The piston valve 14 is provided with a central, axial passage 35 therethrough which interconnects the chambers 21 and 22. Mounted on that end of the piston valve 14 which faces in the direction of closing movement of the piston valve is a valve means 36 which permits free fluid flow between the chambers 21 and 22 during opening movement of the piston valve 14, but which provides for only restricted fluid flow between the chambers 21 and 22 during closing movement of the piston valve, thereby limiting the rate at which the piston valve can be moved to its closed position to avoid pressure surges in any system in which the valve of the invention is connected. The valve means 36 is shown as including a plate 37 which is guided for axial movement relative to the piston valve 14 by headed pins or studs 38, the plate 37 being adapted to seat on the piston valve 14 over one end of the passage 35 in response to movement of the piston valve 14 toward its closed position. In response to movement of the piston valve 14 toward its open position, the plate 37, also referred to hereinafter as a valve element, automatically unseats to fully open the passage 35. The plate 37 is provided with a restricted orifice 40 therethrough which provides for limited fluid flow through the passage 35 when the plate 37 is seated.

Thus, during closing movement of the piston valve 14, the plate 37 is seated and only restricted fluid flow between the chambers 21 and 22 can take place, thereby limiting the rate of closing movement of the valve. However, during opening movement of the valve, the plate 37 automatically unseats to provide free flow between the chambers 21 and 22 by way of the passage 35, thereby permitting quick opening of the valve.

It will be noted that the chambers 21 and 22 are separated from the flow passage through the valve body 10 for any position of the piston valve 14 so that the fluid in the chambers 21 and 22, which may be air, for example, may differ from the fluid flowing through the flow passage through the valve body.

Although I have disclosed an exemplary embodiment of my invention, it will be understood that I do not intend to be limited strictly thereto, except insofar as may be required by the full scope of the following claim:

In a valve, the combination of: a valve body having inlet and outlet ports therein; a valve member movable in said valve body between open and closed positions and having means for interconnecting said inlet and outlet ports in fluid communication when in said open position, said valve body providing fluid chambers on opposite sides of said valve member, said valve member having a passage therethrough which interconnects said fluid chambers and having means sealingly and slidably engaging said valve body for preventing fluid communication between said chambers except by way of said passage, and said valve member providing a valve-element seat which encircles said passage and which faces in the direction of closing movement of said valve member; and a valve element carried by said valve member and adapted to seat on said valve-element seat to close said passage in response to closing movement of said valve member, said valve element having a restricted orifice therethrough which is smaller than said passage to permit restricted flow of fluid through said passage between said chambers during closing movement of said valve member, said valve element unseating during opening movement of said valve member to permit free fluid flow through said passage between said chambers during opening movement of said valve member.

References Cited in the file of this patent

UNITED STATES PATENTS

| | | |
|---|---|---|
| 1,995,299 | Foulds | Mar. 26, 1935 |
| 2,059,808 | Robart | Nov. 3, 1936 |
| 2,132,030 | Hunt | Oct. 4, 1938 |
| 2,526,039 | Oakes | Oct. 17, 1950 |
| 2,672,158 | Cormany | Mar. 16, 1954 |
| 2,708,452 | Tappan | May 17, 1955 |

FOREIGN PATENTS

| | | |
|---|---|---|
| 812,178 | Germany | Aug. 27, 1951 |